(12) United States Patent
Borroni et al.

(10) Patent No.: US 9,981,375 B2
(45) Date of Patent: May 29, 2018

(54) METHOD AND APPARATUS TO MOVE AN ARTICULATED ARM

(71) Applicant: CIFA SPA, Senago (IT)

(72) Inventors: Alberto Giovanni Borroni, Cesano Maderno (IT); Paolo Francesco Ragaini, Milan (IT); Ulrich Delogu, Canzo (IT)

(73) Assignee: CIFA SPA, Senago (IT)

( * ) Notice: Subject to any disclaimer, the term of this patent is extended or adjusted under 35 U.S.C. 154(b) by 250 days.

(21) Appl. No.: 14/928,583

(22) Filed: Oct. 30, 2015

(65) Prior Publication Data
US 2016/0121481 A1    May 5, 2016

(30) Foreign Application Priority Data

Oct. 31, 2014   (IT) .............................. MI2014A1874

(51) Int. Cl.
| | |
|---|---|
| *B25J 9/06* | (2006.01) |
| *B66C 13/20* | (2006.01) |
| *B66C 13/46* | (2006.01) |
| *E04G 21/04* | (2006.01) |
| *B25J 9/14* | (2006.01) |
| *B25J 9/16* | (2006.01) |
| *E02F 9/26* | (2006.01) |

(52) U.S. Cl.
CPC . *B25J 9/06* (2013.01); *B25J 9/14* (2013.01); *B25J 9/1656* (2013.01); *B66C 13/20* (2013.01); *B66C 13/46* (2013.01); *E04G 21/0463* (2013.01); *E02F 9/264* (2013.01); *Y10S 901/02* (2013.01); *Y10S 901/09* (2013.01)

(58) Field of Classification Search
CPC ...... B25J 9/06; B25J 9/14; B25J 9/166; B66C 13/20; E04G 21/0463
See application file for complete search history.

(56) References Cited

U.S. PATENT DOCUMENTS

| | | | | |
|---|---|---|---|---|
| 3,596,156 | A * | 7/1971 | Davey ..................... | B66C 13/26 318/258 |
| 4,219,121 | A * | 8/1980 | McPeak .................. | B66C 13/50 212/281 |
| 8,352,128 | B2 * | 1/2013 | Stocker ................... | B66C 13/46 212/272 |
| 8,930,094 | B2 * | 1/2015 | Torii ....................... | B66C 13/20 701/123 |
| 9,045,316 | B2 * | 6/2015 | Wan ....................... | B66C 13/066 |
| 9,120,651 | B1 * | 9/2015 | Bailey ..................... | B66C 13/18 |

FOREIGN PATENT DOCUMENTS

| | | |
|---|---|---|
| EP | 1939134 A2 | 7/2008 |
| WO | 0244499 A1 | 6/2002 |
| WO | 02064912 A1 | 8/2002 |
| WO | 2004020765 A1 | 3/2004 |

* cited by examiner

*Primary Examiner* — Patrick H Mackey
(74) *Attorney, Agent, or Firm* — Cantor Colburn LLP

(57) ABSTRACT

Method to move an articulated arm provided with a first end associated with a support and rotatable movement tower and with a second free end and including a plurality of segments pivoted with respect to each other and actuation members configured to make at least one of the segments rotate with respect to one other of the segments or to the support and rotatable movement tower, and where the method allows to manage and control the speed of movement of the articulated arm to determine on each occasion the speed of movement of its free end so that the latter is confined inside a predefined limit value.

12 Claims, 2 Drawing Sheets

METHOD AND APPARATUS TO MOVE AN ARTICULATED ARM

CROSS REFERENCE TO RELATED APPLICATION

This application is related to and claims the benefit of Italian Patent Application No. MI2014A001874 filed on 31 Oct. 2014, the contents of which are herein incorporated by reference in their entirety.

FIELD OF THE INVENTION

The present invention concerns a method and an apparatus for moving an articulated arm.

In particular, the method and apparatus according to the present invention allow to manage and control the speed of movement of an articulated arm to determine, on each occasion, the speed of movement of its terminal end so that the latter is confined within a predefined value.

The present invention is applied to articulated arms used, for example, to pump and deliver concrete from a distance in operating machines such as truck-mounted pumps, concrete truck mixers or suchlike, whether they be mounted or not on trucks or wagons.

BACKGROUND OF THE INVENTION

Heavy work vehicles known in the building sector are known, normally consisting of a truck on which an articulated arm is mounted to distribute and cast concrete.

Known articulated arms consist of a plurality of segments, pivoted to each other and folding back on each other, so as to assume a folded configuration with minimum bulk, positioned close to the truck for transport and movement on the road, and working configurations that allow to reach areas that are even very far from the truck.

Articulated arms also comprise a plurality of actuators, generally linear actuators, each associated with a pair of segments and configured to allow the reciprocal rotation of the segments.

One of the end segments, in particular the innermost segment, is associated with a support and rotatable movement tower mounted on the vehicle and configured to support the articulated arm and to allow it to rotate around a generally vertical axis of rotation.

The support and rotatable movement tower can be equipped with an actuator, generally a rotary actuator, suitable to allow the articulated arm to rotate around said axis of rotation.

Another linear actuator can be provided between the support and rotatable movement tower and the end segment of the articulated arm to allow the latter to rotate around a generally horizontal axis of rotation.

Both the linear actuators and the rotary actuator are generally the hydraulic type and are connected to a command circuit, typically controlled by a control and command unit.

In fact it is known that, if the linear actuators and the rotary actuator are the hydraulic type, the control and command unit is configured to control and command the delivery rate of fluid in the command circuit and, selectively, in at least one of the linear actuators or the rotary actuator.

The entity of the delivery of fluid, commanded in the linear actuators and the rotary actuator, allows to manage the speed of reciprocal rotation of the articulated segments in order to take, with a predetermined value of speed, the external terminal end of the articulated arm with which the concrete delivery element is associated, to the predefined position.

It is also known that, for reasons of safety, the speed of rotation of the articulated segments is limited by specific regulations so that the terminal end of the articulated arm moves with a predefined peripheral speed, lower than a maximum limit.

A regulation is known, for example, which sets an upper limit for the speed of movement of the terminal end to 0.75 m/s, if a linear actuator is used, to 3.00 m/s if several linear actuators are driven simultaneously, and to 1.5 m/s if the rotary actuator of the support and rotatable movement tower is used.

It is also known that the speed of movement of the terminal end is a function not only of the actuation speed of every individual actuator, and hence the angular rotation speed of the one or more segments that are made to rotate by the actuator/actuators, but also of the geometric configuration of the articulated arm and, in particular, the position assumed by the terminal end of the articulated arm.

Indeed it is known that the speed of movement of the terminal end of the articulated arm is given by the product of the angular rotation speed of the segment and the distance of the terminal end from the point of rotation.

It is also known that, in the case of actuators of the hydraulic type, their actuation speed is determined by the delivery rate of work fluid that is pumped into them.

It is also known that current forms of embodiment calculate the limit value of the speed of movement of each segment considering a completely extended configuration thereof. In this case, therefore, the distance of the terminal end from the point of rotation is fixed and equal to the overall length of the articulated arm in its extended condition; consequently, to respect the limit speed condition of the terminal end, the maximum angular rotation speed of each segment must be less than a predefined fixed value.

This condition is the most precautionary one for the movement of the articulated arm and ensures that the speed of the end of the articulated arm never exceeds the set limit, whatever its position.

However, in most cases, the arm is not in the extended configuration and the conditions imposed above entail a slow-down of the movements of the articulated arm above the constraints established by the regulations.

This has a negative effect on the times required for repositioning the articulated arm and hence on the productivity of the machine on which it is mounted.

A device to move an articulated arm is known from the European patent application EP 1939134 A2 (EP'134), which comprises sensors able to detect the positions of the segments that make up the articulated arm and to command its components, by means of an intelligent control device, according to a planned movement.

However, this planned movement is determined to allow to move the terminal end of the arm to a desired position, at the same time keeping the terminal end on a straight line or in a plane.

There is no reference to any control of the position of the terminal end of the arm with reference to a maximum speed of movement determined by regulations.

Consequently, the device known from EP'134 does not provide any planning or regulation of the speed of movement of the components of the articulated arm in order to optimize the movement and repositioning speed while still respecting the regulations: it therefore suffers from the same disadvantages as the known solutions as described above.

One purpose of the present invention is to perfect a method and obtain an apparatus for moving an articulated arm which makes the movement operations very quick yet still respects the safety norms imposed, thus guaranteeing an increase in productivity thanks to the reduction in the times required for repositioning the arm.

Another purpose of the present invention is to perfect a method and obtain an apparatus for moving an articulated arm that is simple and efficient.

Another purpose of the present invention is to perfect a method for moving an articulated arm that allows to increase the speed of movement of the articulated arm compared with known solutions The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a movement method is applied to an articulated arm provided with a first end, inside the arm, associated with a support and rotatable movement tower, and with a second free end, or outside the arm, which determines the terminal point whose maximum speed is defined by the specific regulations as indicated above.

The method comprises the activation of actuation members to reciprocally move a plurality of segments of the articulated arm with respect to each other and/or with respect to the support and rotatable movement tower, and the setting of a limit value of the peripheral speed of movement of the second free end of the articulated arm.

According to one aspect of the present invention, the method also comprises:
 determining the actual and instantaneous position of the second free end of the articulated arm;
 sending a movement command of one or more of the segments and/or of the support and rotatable movement tower to move one or more of the segments with respect to a corresponding articulation point and/or to rotate the support and rotatable movement tower with respect to an axis of rotation;
 determining the maximum angular speed for the one or more segments and/or the support and rotatable movement tower, so that the product of the maximum angular speed and the distance between the second free end and the point of articulation of the segment to be moved, or the axis of rotation of the support and rotatable movement tower, substantially corresponds to the limit value of the peripheral speed of movement of the second free end;
 actuating at least one of the actuation members to make at least one of the segments and/or the support and rotatable movement tower rotate at the maximum angular speed. Moreover, in accordance with the above purposes, a movement apparatus according to the present invention is configured to manage the movement of an articulated arm provided with a first end associated with a support and rotatable movement tower and with a second free end.

Furthermore, the articulated arm comprises a plurality of segments pivoted with respect to each other and actuation members configured to make at least one of the segments rotate with respect to another of the segments or to the support and rotatable movement tower, and to rotate the support and rotatable movement tower.

According to one aspect of the present invention, the movement apparatus comprises at least one position detector configured to detect at least the actual and instantaneous position of the second free end, and a control and command unit connected to the at least one position detector and configured to command the activation of at least one of the actuation members so that at least one of the segments, and/or the support and rotatable movement tower, is made to rotate with a maximum angular speed so that the product of the maximum angular speed and the distance between the second free end and the point of articulation of the segment to be moved, or the axis of rotation of the support and rotatable movement tower, substantially corresponds to a limit value of the peripheral speed of movement of the second free end set in the command and control unit.

In this way it is possible to evaluate, on each occasion, depending on the actual position assumed by the second free end, the maximum angular speed of rotation of each of the segments, since this latter is higher than the speed there would be in the condition of maximum extension of the articulated arm, and respecting the limit movement speed of the second free end.

This allows to make the movements of the articulated arm much quicker, adapting them on each occasion to the instantaneous geometric configuration thereof.

According to a possible solution, the control and command unit is configured to calculate the distance of the second free end with respect to the point of rotation around which the at least one segment is made to rotate by the actuation member.

According to a possible form of embodiment, and if the actuation members are the hydraulic or pneumatic type, the control and command unit is configured to regulate the delivery rate of a work fluid in the actuation members. By regulating the delivery rate of the work fluid, it is possible to regulate the speed of the actuation members and determine the angular speed of rotation of the segment, to the maximum possible value so that, for that position detected of the arm, the speed of the second free end does not exceed the predetermined maximum threshold.

According to a possible variant, and if the actuation members are the electric type, the control and command unit is configured to regulate at least one electric power parameter, for example current or voltage, of the actuation members.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
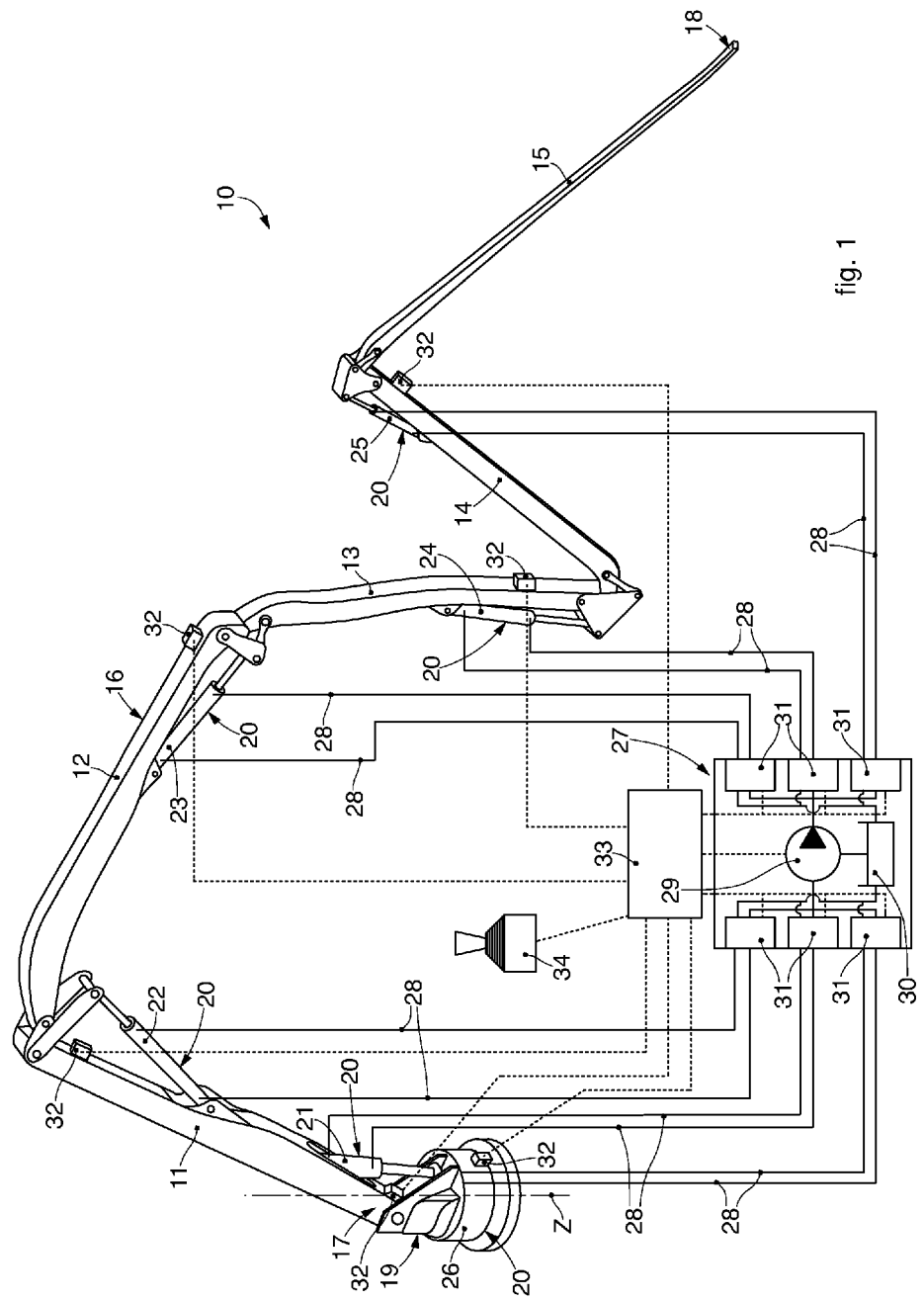
FIG. 1 is a schematic representation of an apparatus for moving an articulated arm according to a possible form of embodiment of the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

With reference to FIG. 1, an apparatus 10 is shown for moving an articulated arm 16 which comprises a plurality of segments connected to each other.

The articulated arm 16 can be the type used to deliver a cast of concrete.

The articulated arm 16 can be installed on a vehicle, not shown in the drawings, which allows the articulated arm 16 to be transported by road.

According to a possible solution, the articulated arm 16 is provided with a first end 17, substantially fixed during use, and a second free end 18.

Elements to support or attach a load, or elements to deliver a material, such as a pipe for delivering concrete, can be associated with the second free end 18 of the articulated arm 16.

According to a possible solution, the first end 17 of the articulated arm 16 is connected to a support and rotatable movement tower 19, hereafter referred to only as support tower 19. According to some possible solutions, the first end 17 of the articulated arm 16 is pivoted to the support tower 19 around an axis that, in the case shown here, is substantially horizontal.

According to the form of embodiment shown in FIG. 1, the movement apparatus 10 comprises five segments, respectively a first segment 11, a second segment 12, a third segment 13, a fourth segment 14 and a fifth segment 15. Although in the present description we shall refer to an articulated arm 16 comprising five segments, it is not excluded that in other forms of embodiment the number of segments can be more or less than five, for example four or six.

According to a possible solution, the segments 11-15 are reciprocally pivoted to each other to define an articulated structure of the articulated arm 16. According to a possible solution, the segments 11-15 can lie substantially on the same operating plane.

The articulated arm 16 is suitable to assume at least one closed operating condition, in which the individual segments 11-15 are folded back on each other in a configuration of minimum bulk, for example to allow road transport, and a second extended operating condition, in which the segments 11-15 assume a configuration desired by the operator to dispose the second end 18 in a predefined position, for example a site where concrete is to be cast.

To this purpose actuation members 20 are associated with the segments 11-15, and are configured to allow the segments 11-15 to rotate, generally around a pivoting end or articulation thereof.

According to a possible solution, the actuation members 20 can be chosen from a group comprising linear actuators, rotary actuators, rack mechanisms, worm screw mechanisms, articulated kinematisms, or a possible combination thereof.

According to another form of embodiment, the actuation members 20 can be the hydraulic, electric, pneumatic or magnetic type.

According to the solution shown in FIG. 1, the actuation members 20 comprise five linear actuators, respectively a first linear actuator 21, a second linear actuator 22, a third linear actuator 23, a fourth linear actuator 24 and a fifth linear actuator 25 configured to regulate the reciprocal angular position respectively of the support tower 19 and the first segment 11, of the first segment 11 and the second segment 12, of the second segment 12 and the third segment 13, of the third segment 13 and the fourth segment 14 and of the fourth segment 14 and the fifth segment 15.

According to a possible solution, the actuation members 20 comprise a rotary actuator 26, configured to rotate the support tower 19 and hence the articulated arm 16 associated therewith, around an axis of rotation Z which, in this case, is substantially vertical.

According to the solution shown in FIG. 1, the linear actuators 21-25 and the rotary actuator 26 are the hydraulic type.

According to a possible solution, the actuation members 20 are connected to a command circuit 27 configured to selectively activate the actuation members 20 and to determine the movement of the segments 11-15.

According to the solution shown in FIG. 1, the command circuit 27 is the hydraulic type to determine the selective activation of the actuation members 20. However, it cannot be excluded that in other solutions, the command circuit is the electric or pneumatic type.

According to the form of embodiment in FIG. 1, the command circuit 27 comprises a plurality of connections 28 configured to connect the command circuit 27 to the actuation members 20.

If the command circuit 27 is the hydraulic or pneumatic type, the connections 28 can comprise pipes for the passage of the work fluid, whereas if the command circuit is the electric type, the connections 28 can comprise conductor wires.

According to the form of embodiment in FIG. 1, the command circuit 27 comprises a pumping device 29, connected to the actuation members 20, for example by connections 28, and configured to selectively pump a work fluid to the actuation members 20.

The pumping device 29 in its turn can be connected to a tank 30 for containing the work fluid, which is supplied to the pumping device 29.

The command circuit 27 is also provided with a plurality of distribution members 31, each of which is associated with one of the actuation members 20 and configured to allow the selective feed of the work fluid to the actuation members 20.

The distribution members 31 can comprise distributor valves, possibly piloted electrically, electronically, pneumatically or in other ways.

The distribution members 31 can be connected, in their turn, both to the pumping device 29 to allow to feed the work fluid to the actuation members 20, and also to the tank 30 to allow to discharge the work fluid from the actuation members 20.

According to one form of embodiment of the present invention, the movement apparatus 10 comprises at least one position detector 32 configured to detect at least the position of the second free end 18 of the articulated arm 16.

In this way it is possible to evaluate the position of the second free end 18 of the articulated arm 16 with respect to a fixed point, for example with respect to the first end 17 or the support tower 19, or with respect to a point around which one or more of the segments 11-15 are made to rotate.

According to a possible solution, the movement apparatus 10 comprises a plurality of position detectors 32, each of which associated with one of the segments 11-15 to evaluate the reciprocal position of the latter. The information collected by the position detectors 32 allows to determine the geometric configuration of the articulated arm 16, and in this way to determine the final position of the second free end 18 as well.

According to some possible solutions, the position detectors 32 can be chosen from a group comprising optical detectors, capacitive detectors, magnetic detectors, ultrasound detectors.

According to some possible solutions, the position detectors 32 can comprise at least one of either an infrared detector, an encoder, a Hall effect sensor or suchlike.

According to a possible solution, the position detectors 32 can be configured to define the position of the segments 11-15 with respect to an absolute reference system, for example in correspondence with the support tower 19.

According to a variant, the position detectors 32 can be configured to detect the reciprocal angle between adjacent segments 11-15. According to this form of embodiment, the position detectors 32 can be associated or integrated with the pivoting elements provided between the segments 11-15.

According to another form of embodiment of FIG. 1, the position detectors 32 can be associated with the actuation members 20 and allow to detect the entity of movement of the actuation members 20.

According to a possible solution, the position detectors 32 can be associated with the linear actuators 21-25.

The position detectors 32 can be configured to detect the linear travel to which the linear actuators 21-25 are subjected during use.

According to the form of embodiment in FIG. 1, at least one of the position detectors 32 is associated with the support tower 19 and is configured to detect its angular position with respect to an absolute reference system. In this way, even when the rotary actuator 26 is activated, it is possible to determine on each occasion the position of the articulated arm 16.

According to this form of embodiment, the position detector 32 is associated with the rotary actuator 26 and is configured to detect the angular travel to which the rotary actuator 26 is subjected during use.

According to a possible solution, at least one of the position detectors 32 can be associated with at least one of either the support tower 19 or the first segment 11, to define the reciprocal position of the first segment 11 with respect to the support tower 19.

Between the first segment 11 and the second segment 12, between the second segment 12 and the third segment 13, between the third segment 13 and the fourth segment 14 and between the fourth segment 14 and the fifth segment 15 respective position detectors 32 are interposed to define the reciprocal angular position of the segments 11-15.

According to some forms of embodiment of the present invention, the movement apparatus 10 comprises a control and command unit 33 connected at least to the position detectors 32 and configured to collect information from them and to determine the geometric configuration and positioning of the articulated arm 16.

The control and command unit 33 can comprise at least a calculator configured to control and manage the movement of the articulated arm 16.

According to a possible solution, the control and command unit 33 is configured to manage the speed of movement of the actuation members 20, and hence the peripheral speed of movement of the second free end 18.

According to a possible aspect of the present invention, the control and command unit 33 is configured to calculate the distance of the second free end 18 with respect to the point of rotation of the at least one segment 11-15 that is made to rotate. In fact, since the control and command unit knows which is the actuation member 20 activated, it is also able to know the point of rotation around which the one or more of the segments 11-15 are rotated.

According to a possible solution, the control and command unit 33 can also be connected to the pumping device 29 to control the selective activation of the actuation members 20.

It can be provided, for example, that the control and command unit 33 is configured to manage the functioning of the pumping device 29, for example to control the flow of work fluid that it processes. According to a possible form of embodiment of the present invention, the control and command unit 33 can act on a regulation member associated with the pumping device 29 and configured to manage the functioning thereof.

In a possible formulation of the present invention, the control and command unit 33 can also be connected to the distribution members 31 and is configured to selectively activate/de-activate the functioning of the actuation members 20.

According to a possible form of embodiment of the present invention, the control and command unit 33 is configured to manage, for example, the delivery rate of work fluid directed to the actuation members 20.

By regulating the delivery rate of the work fluid it is possible to determine the actuation speed of each of the actuation members 20.

The actuation speed of the actuation members 20 allows to determine the peripheral speed of movement of the second terminal end 18 of the articulated arm 16.

According to a possible solution, the control and command unit 33 can command the activation/de-activation of the distribution members 31 and can manage the selective feed of the work fluid to regulate the delivery rate of work fluid to the actuation members 20.

According to a possible solution, command means 34 can also be associated with the control and command unit 33, such as a pushbutton, a joystick, pedals or suchlike, to allow an operator to manage the movement of the articulated arm 16.

The present invention also concerns a method for moving the articulated arm 16.

According to a possible solution, the method comprises setting a value of peripheral speed of movement at least of the second free end 18 of the articulated arm 16 to a maximum limit speed value.

According to a possible solution, the maximum limit speed value can be determined as a function of current safety regulations in the field of articulated arms.

According to a possible solution, the maximum limit speed value can be equal to or less than 0.75 m/s, if one of the linear actuators 21-25 is commanded to be activated.

According to a possible solution, the maximum limit speed value can be equal to or less than 3.00 m/s, if several linear actuators 21-25 are commanded to be activated simultaneously.

According to a possible solution, which can be combined with the solutions described here, the maximum limit speed value can be equal to or less than 1.5 m/s, if the rotary actuator 26 for the rotation of the support tower 19 is commanded to be actuated.

Setting the maximum limit speed value can be performed directly by an operator, for example by programming the control and command unit 33.

According to one formulation of the invention, the method also comprises determining the position of the second free end 18 of the articulated arm 16.

According to a possible solution, determining the position of the second free end 18 provides to determine the geometric configuration of the articulated arm 16, that is, the reciprocal positioning of each of the segments 11-15. As a function of the reciprocal positioning of the segments 11-15, it is possible to determine the position of the second free end 18.

In this form of embodiment, it can be provided that the geometric parameters of each of the segments 11-15 are memorized in the control and command unit 33, such as the length, the position of the respective pivoting elements and the overall bulk of each of the segments 11-15.

According to this form of embodiment, it can be provided that to determine the second free end 18, the reciprocal angular position of each of the segments 11-15 is detected.

In relation to the reciprocal angular position of the segments 11-15, and knowing the sizes of each of the segments 11-15, the control and command unit 33 determines a mathematical model of the geometric configuration of the articulated arm 16, in this way determining the position of the second free end 18.

According to a possible solution, the position of the second free end 18 is evaluated with respect to that of the first end 17.

According to a possible solution of the present invention, it is also provided to evaluate the position of each segment 11-15 with respect to a reference system located for example at the center of the rotary actuator 26.

According to a possible solution of the invention, determining the position of the second free end 18 of the articulated arm 16 can be made substantially continuously during the movement of the articulated arm 16.

It can be provided that the control and command unit 33 receives, substantially continuously, the detections made by the position detectors 32 and determines, instant by instant, the geometric configuration of the articulated arm 16 and the up-dated position of the second free end 18.

According to a possible solution, the method also comprises the actuation of at least one of the actuation members 20 to make at least one of the segments 11-15 rotate with respect to another segment 11-15 or to the support tower 19. It is therefore possible to know, with respect to a reference system, which in this case is located in correspondence with the center of the rotary actuator, the position assumed instantaneously by each of the segments 11-15 and that of the second free end 18.

According to one form of embodiment of the present invention, the actuation members 20 are commanded by the control and command unit 33 so that they make at least one of the segments 11-15 rotate with a maximum allowed angular speed, calculated as a function of the position assumed by the second free end 18 and so that, during movement, the second free end 18 moves with a peripheral speed of movement around the maximum limit speed value.

According to a possible formulation of the present invention, it can be provided that the maximum angular speed allowed is calculated with the formula $\omega = v/r$, where "$\omega$" is the angular rotation speed of at least one of the segments 11-15, "v" is the limit value of the peripheral speed of movement set for the second free end 18, and "r" is the distance of the second free end 18 with respect to the point of rotation around which the at least one segment 11-15 is made to rotate.

Having set the limit value of the peripheral speed of movement "v", and determining with the position detectors 32 on each occasion the distance "r" of the second free end 18, it is possible to calculate instantaneously the maximum possible angular speed $\omega$ which allows to respect the conditions imposed.

According to a possible form of embodiment, the distance "r" is calculated instantaneously on each occasion, in relation to the reciprocal geometric configuration assumed by the segments 11-15.

According to a possible formulation of the present invention, the control and command unit 33 commands the actuation speed of the actuation members 20 so that they make the segments 11-15 rotate with the maximum angular speed calculated.

According to a possible solution, if the actuation members 20 are the hydraulic or pneumatic type, the control and command unit 33 can manage the delivery rate of a work fluid from and/or to the actuation members 20.

According to a variant, if the actuation members 20 are the electric type, the control and command unit 33 manages electric power parameters of the actuation members 20, to determine the speed of movement thereof.

According to a possible solution, the control and command unit 33 is configured to memorize the geometric and functioning parameters of each of the actuation members 20, for example sizes, linear travels, rotary travels, cubic capacities, limit speed. Depending on said parameters, the control and command unit 33 manages the functioning of the actuation members 20 to command their actuation speed.

Figure 2:
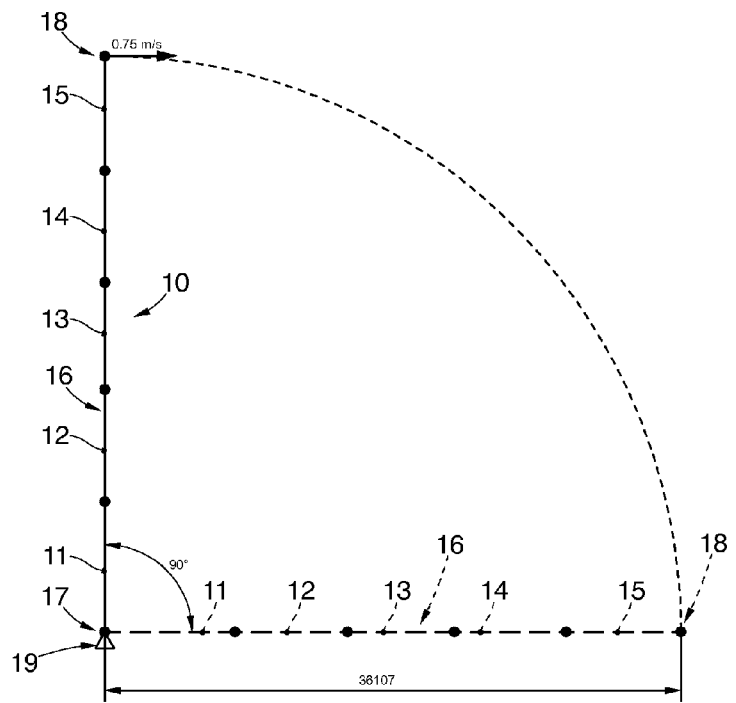
FIG. 2 is a schematic illustration of an articulated arm in one possible geometric configuration.
Figure 3:
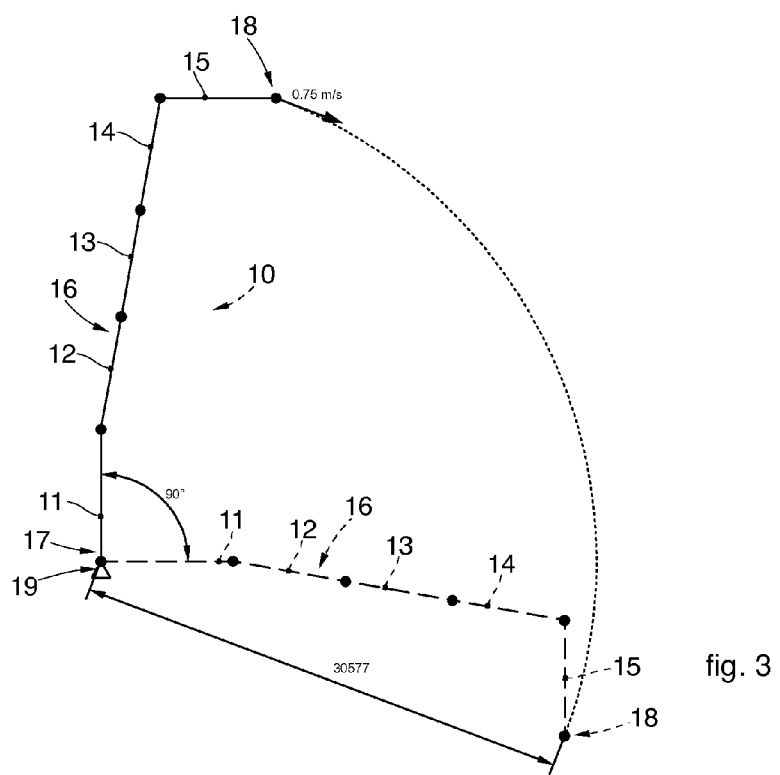
FIG. 3 is a schematic illustration of an articulated arm in another geometric configuration.

According to a possible solution, FIGS. 2 and 3 show schematically two different geometric configurations of the articulated arm 16, each in a first position and a second position, rotated with respect to the first position by an angle of 90°.

In particular, it is provided to actuate the first actuator 21, not shown in FIGS. 2 and 3, to make the articulated arm 16 rotate around the first end 17. For a rotation of 90° of the articulated arm 16, the first actuator 21 has to perform the whole travel, completely filling its chamber on the bottom side and consequently emptying the chamber on the stem side, or vice versa.

It is assumed that the first actuator 21 has a cubic capacity of the chamber on the bottom side $V_{BOTTOMSIDE}$ of 59.8 liters, and a cubic capacity of the chamber on the stem side $V_{STEMSIDE}$ of 38.3 liters.

It is also assumed that the limit value of the peripheral speed of movement is set at 0.75 m/s.

In the geometric configuration shown in FIG. 2, the articulated arm 16 is at its maximum extension and the first end 17 and the second free end 18 are distanced by a distance of 36107 mm.

For a rotation of 90°, the second free end 18 of the articulated arm 16 travels through a space $$S = \frac{\pi}{2} * 36,107 = 56.72 \text{ m.}$$

Setting a peripheral speed limit of 0.75 m/s, the time required to travel said space S is $$t = \frac{S}{v_{limit}} = \frac{56.72}{0.75} = 75.6 \text{ s,}$$

which substantially corresponds to the time of movement of the articulated arm 16.

This allows to calculate the delivery rate of the work fluid into or from the chamber on the stem side and the chamber on the bottom side.

$$Q_{BOTTOMSIDE} = \frac{59.8}{75.6} = 0.79 \text{ l/s}$$

$$Q_{STEAMSIDE} = \frac{38.3}{75.6} = 0.51 \text{ l/s}$$

According to the configuration shown in FIG. 3, the articulated arm 16 has a not completely extended reciprocal positioning of the segments 11-15 and the first end 17 and the second free end 18 are distanced by a distance of 30577 mm.

This distance is evaluated by using the position detectors 32.

According to the state of the art, to complete the same angular travel of 90°, in the configuration in FIG. 3, the articulated arm 16 uses the same travel time as calculated above.

On the contrary, in accordance with the solution of the present invention, the control and command unit 33 allows to manage the movement of the articulated arm 16 as a function of the geometric configuration of the latter but in any case respecting the constraints of the limit value of the peripheral speed of movement imposed.

According to the solution in FIG. 3, for a rotation of 90°, the second free end 18 of the articulated arm 16 travels through a space $$S = \frac{\pi}{2} * 30,577 = 48.03 \text{ m}.$$

The movement time of the articulated arm 16, respecting the limit value of the peripheral speed of movement imposed, can be calculated as $$t = \frac{S}{v_{limit}} = \frac{48.03}{0.75} = 64 \text{ s}.$$

From the example shown above, it is therefore possible to see how, with the present invention, the movement times of the articulated arm can be drastically reduced while still respecting the speed limit set.

It is clear that modifications and/or additions of parts may be made to the method and movement apparatus 10 as described heretofore, without departing from the field and scope of the present invention.

It is also clear that, although the present invention has been described with reference to some specific examples, a person of skill in the art shall certainly be able to achieve many other equivalent forms of method and movement apparatus 10, having the characteristics as set forth in the claims and hence all coming within the field of protection defined thereby.

The invention claimed is:

1. Method for moving an articulated arm provided with a first end associated with a support tower and with a second free end, the method comprising the activation of actuation members to reciprocally move a plurality of segments of said articulated arm with respect to each other and/or with respect to said support tower, and the setting of a maximum set allowable limit value of the peripheral speed of movement of said second free end of the articulated arm, the method comprising:

determining the actual and instantaneous position of the second free end of said articulated arm;

sending a movement command of one or more of said segments and/or of said support tower to move one or more of said segments with respect to a corresponding articulation point and/or to rotate the support tower with respect to an axis of rotation;

calculating the maximum angular speed for said one or more segments and/or said support tower, so that the product of said maximum angular speed and the distance between the second free end and the point of articulation of the segment to be moved, or the axis of rotation of the support tower, corresponds to said limit value of the peripheral speed of movement of the second free end, wherein said maximum angular speed is calculated with the formula ω=v/r, where "ω" is the angular rotation speed of at least one of said segments, "v" is the maximum allowable limit value of the peripheral speed of movement set for said second free end, and "r" is the distance of said second free end with respect to the point of rotation around which the at least one of said segments is made to rotate;

actuating at least one of said actuation members to make at least one of said segments and/or said support tower rotate at said maximum angular speed.

2. Method as in claim 1, wherein as a function of the position from the second free end the distance is calculated of the second free end with respect to the point of rotation of the at least one segment.

3. Method as in claim 1, wherein during the measuring of the position of the second free end it is provided to measure the reciprocal positioning between adjacent segments.

4. Method as in claim 1, wherein measuring the position of the second free end of the articulated arm is carried out continuously during the movement of the articulated arm.

5. Method as in claim 1, wherein during the activation of said actuation members the delivery rate of a work fluid is regulated from and/or toward the actuation members, to determine the speed of movement of the latter.

6. Articulated arm comprising:

a movement apparatus for said articulated arm;

a first end associated with a support tower and with a second free end;

a plurality of segments pivoted with respect to each other; and actuation members configured to make at least one of said segments rotate with respect to another of said segments or to said support tower, and to rotate said support tower;

wherein the movement apparatus comprises:

at least one position detector configured to detect at least the actual and instantaneous position of said second free end; and a control and command unit connected to the at least one position detector and configured to command the activation of at least one of said actuation members so that at least one of said segments and/or said support tower is made to rotate with a maximum angular speed so that the product of said maximum angular speed and the distance between the second free end and the point of articulation of the segment to be moved, or the axis of rotation of the support tower, corresponds to a maximum set allowable limit value of the peripheral speed of movement of the second free end programmed in said command and control unit.

7. Articulated arm as in claim 6, wherein it comprises a plurality of said position detectors each associated with one of the segments for the evaluation of the reciprocal position between adjacent segments.

8. Articulated arm as in claim 6, wherein it comprises a plurality of said position detectors each associated with one of said actuation members to detect the entity of movement of said actuation members.

9. Articulated arm as in claim 6, wherein said position detectors are configured to detect the reciprocal angulation between adjacent segments.

10. Articulated arm as in claim 6, wherein said actuation members are connected to a command circuit configured to selectively activate said actuation members and determine the movement of said segments, said command circuit being managed by said control and command unit.

11. Articulated arm as in claim 10, wherein said command circuit is of the hydraulic or pneumatic and is provided with a plurality of distribution members, each of which associated with one of the actuation members and configured to allow the selective feed of a work fluid toward said actuation members.

12. Articulated arm as in claim 10, wherein said command circuit comprises a pump device configured to selectively pump a work fluid toward the actuation members and wherein said control and command unit is connected to said pump device to control the selective activation of the actuation members.

* * * * *